United States Patent [19]

Huenefeld et al.

[11] Patent Number: 4,716,899
[45] Date of Patent: Jan. 5, 1988

[54] DEVICE FOR ATTACHING AN IDENTIFICATION TAG TO AN EAR OR THE LIKE OF AN ANIMAL

[75] Inventors: Joseph M. Huenefeld; James R. Haas, both of Fort Thomas, Ky.

[73] Assignee: Hasco International, Inc., Dayton, Ky.

[21] Appl. No.: 874,023

[22] Filed: Jun. 13, 1986

[51] Int. Cl.⁴ .............................................. G09F 3/00
[52] U.S. Cl. ..................................... 128/330; 81/367; 227/144; 128/321
[58] Field of Search ................... 128/330, 329 R, 321; 227/144; 81/367-380, 342

[56] References Cited

U.S. PATENT DOCUMENTS

| | | | |
|---|---|---|---|
| 2,555,133 | 5/1951 | Horstmann | 128/329 R |
| 3,252,360 | 5/1966 | Ortman | 81/379 |
| 4,451,999 | 6/1984 | Yvorra | 128/330 |

FOREIGN PATENT DOCUMENTS 2464643  3/1981  France ................. 128/330

Primary Examiner—Michael H. Thaler
Attorney, Agent, or Firm—James W. Pearce; Roy F. Schaeperklaus

[57] ABSTRACT

A tool for applying an identification tag body and a tag retainer to an ear of an animal. The tool includes a main handle member on which a tag body is mounted, a swinging bracket pivotally mounted on the main handle member, a second handle member pivotally connected to the swinging bracket, a first sliding link member pivotally connected to the second handle member, and a second sliding link member pivotally connected to the second handle member. The tag retainer is mounted on the swinging bracket. As the swinging bracket swings, the tag retainer can pass through the animal's ear and enter a boss of the tag body for locking therein. Support structure on each of the sliding link members can engage support pins mounted on the main handle member so that linkage of the tool can advance in two stages as the handles are advanced toward each other. The support structure of the sliding link members can come free of the associated support pins, one at a time. Both support pins can engage support structure of the sliding link members when the handles are in an intermediate or transistion position. The swinging bracket moves in ear puncturing direction with increasing mechanical advantage as the handles are urged toward each other in the first stage with a maximum advantage as the transition position is reached and the tag retainer penetrates the animal ear. Further advance during the second stage following passing of the transition position causes advance with mechanical advantage increasing from a lower value than that reached in the first stage.

3 Claims, 14 Drawing Figures

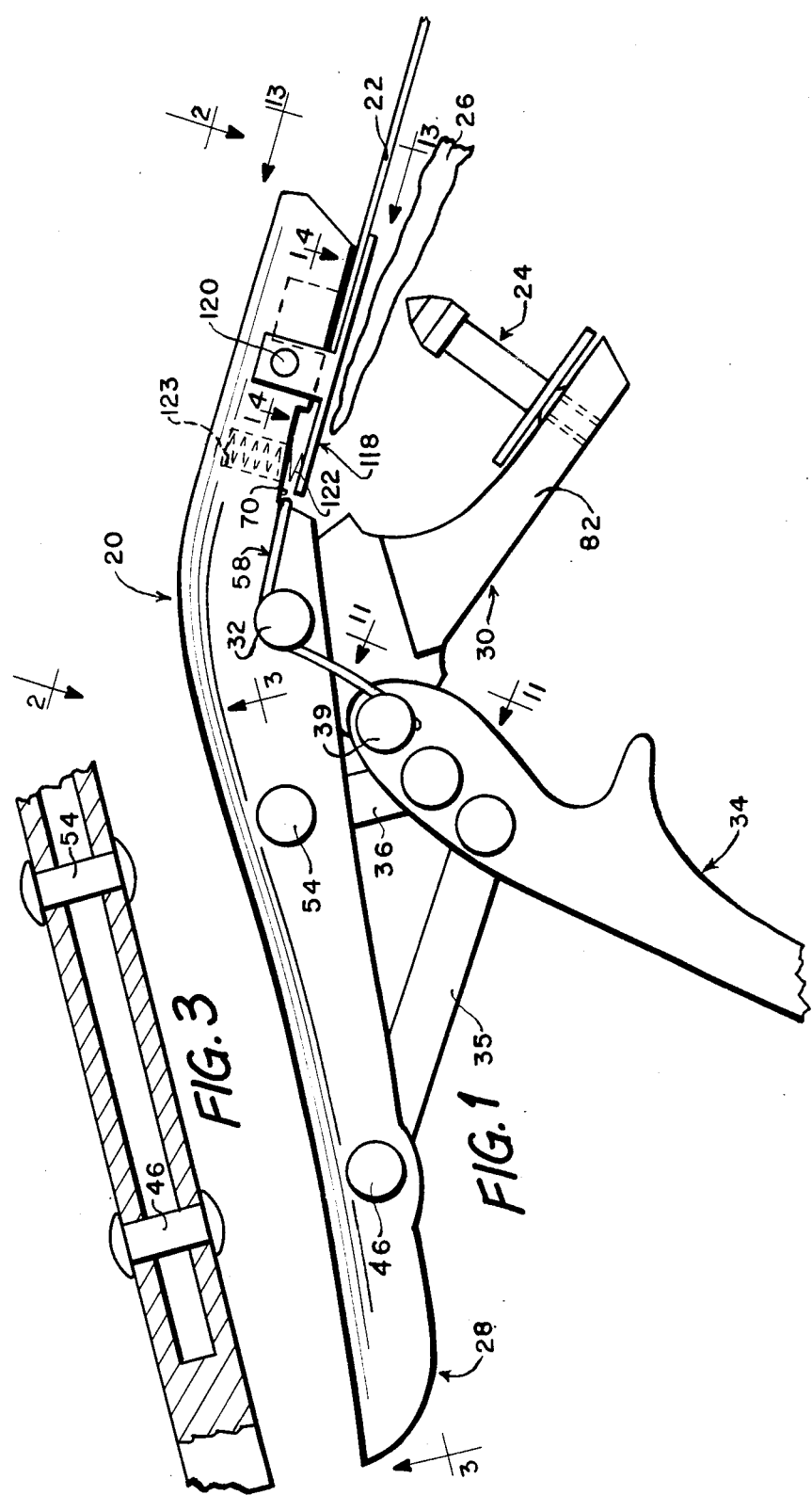

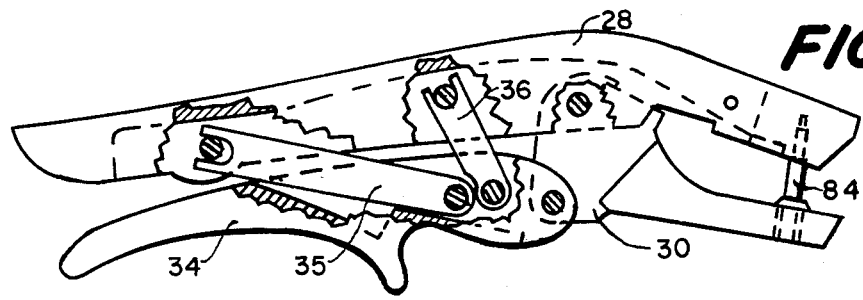
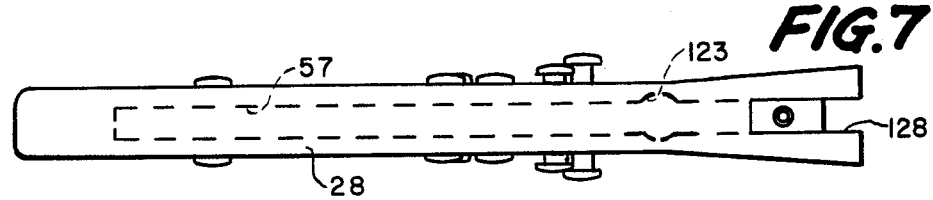
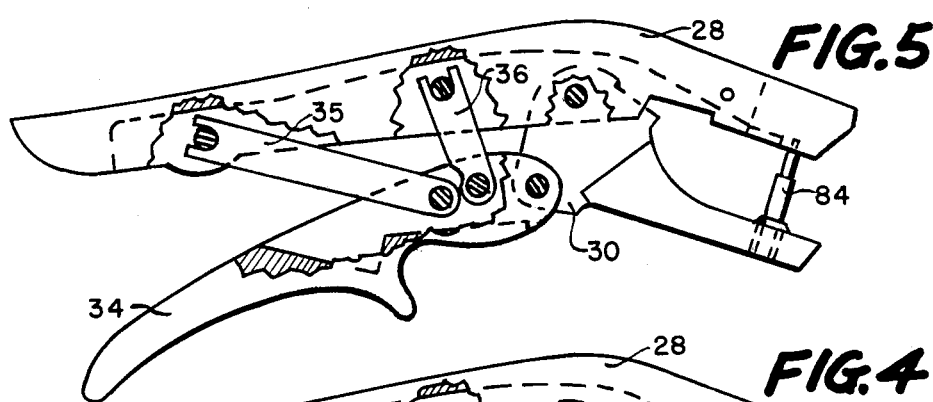
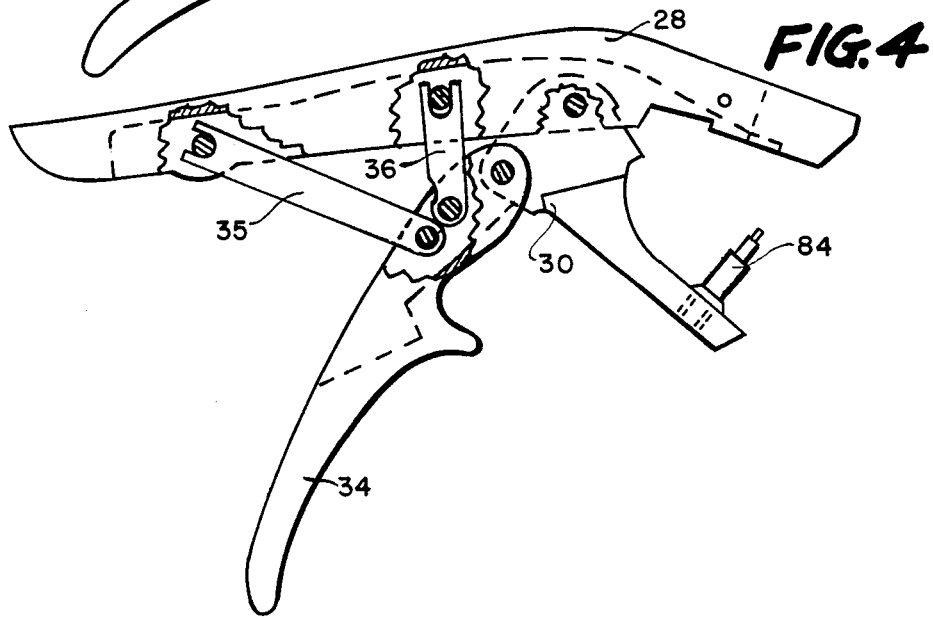

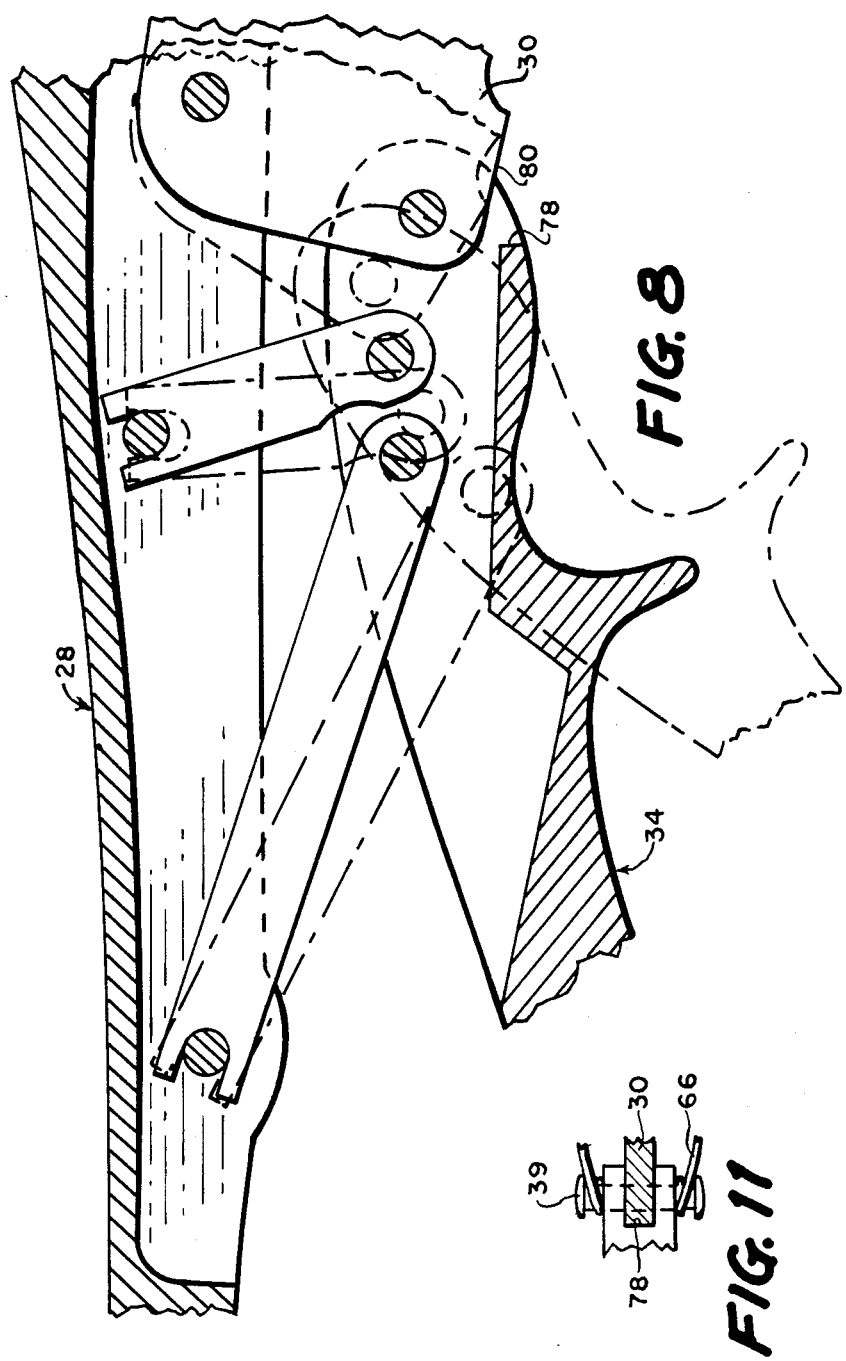

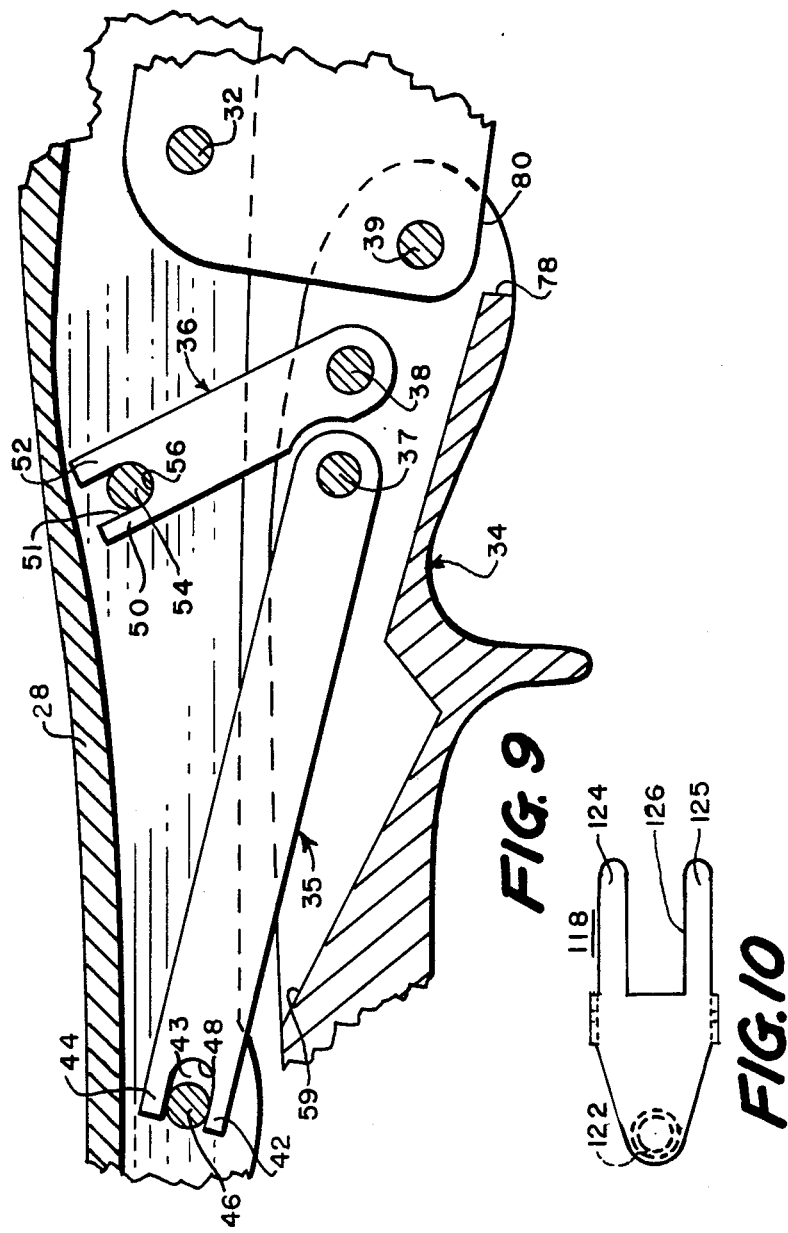

DEVICE FOR ATTACHING AN IDENTIFICATION TAG TO AN EAR OR THE LIKE OF AN ANIMAL

BACKGROUND OF THE INVENTION

This invention relates to a device for attaching an identification tag to an ear or the like of an animal in which a drive pin member is pivotally mounted for movement between limit positions.

Devices for attaching identification tags to ears of animals are shown in U.S. Pat. Nos. 3,731,414, 4,368,735, 4,402,320, 4,451,999, French Pat. No. 2,464,643, and in the copending application Ser. No. 06/713,991 filed Mar. 20, 1985 now U.S. Pat. No. 4,672,966 issued June 16, 1987.

Drive pin breakage and tag damage resulting from jerk reaction of animals, coupled with failure of the tag body and retainer assembly attached to the animal to separate from the drive pin or other portion of the tag attaching device, has been a long continuing problem.

An object of this invention is to provide such a device which holds both a tag body and a tag retainer as the tag retainer is inserted through an ear of an animal and into position in a socket in the tag body.

A further object of this invention is to provide such a device in which the pressure on drive handles causes rapid relative movement of the tag body and tag retainer with increasing pressure as a transition position is approached and the tag retainer penetrates the animal's ear, and in which further advance of the tag body and tag retainer beyond said transition position to assembled condition in the animal's ear is with reduced driving force supplied as necessary to cause interaction between the tag body and the tag retainer.

BRIEF DESCRIPTION OF THE INVENTION

Briefly, this invention provides a tool for attaching an identification tag body and a tag retainer to an ear of an animal. The tool includes a main handle member, a swinging bracket pivotally mounted on the main handle member, and a second handle member pivotally mounted on the swinging bracket. Means is provided on the main handle member and on the swinging bracket for supporting a tag body and a tag retainer, respectively. First and second sliding link members are pivotally mounted on the second handle member and span the handle members. Each of the sliding link members has a slot which receives a respective one of a pair of support pins mounted on the main handle member. Spring means urges the handle members to an open position. When the handle members are pushed toward each other, a first of the sliding link members engages the associated pivot pin at a bearing end of the slot thereof while a bearing end of the slot of the second of the sliding link members is not engaged by the associated pivot pin. The handle members advance to a transition position at which the bearing end of the slot of each of the sliding link members engagingly bears on its associated support pin. Thereafter, as the handle members are further advanced, the bearing end of the slot of the second of the sliding link members remains in engagement with its associated support pin while the bearing end of the slot of the first of the sliding link members moves away from bearing engagement with its associated support pin. Thus, different mechanical advantages are provided by each of the sliding link members in their respective stage of operation, and their respective stages of operation are separated by the transition position. The linkages can be arranged to provide rapid advance of the tag retainer toward the tag body succeeded by advance with maximum pressure as the transition position is approached and thereafter advance with lesser pressure as the tag body and the tag retainer are seated in assembled relation.

The above and other objects and features of the invention will be apparent to those skilled in the art to which this invention pertains from the following detailed description and the drawings, in which:

BRIEF DESCRIPTION OF THE DRAWINGS

FIG. 1 is a view in side elevation of a tag applying tool constructed in accordance with an embodiment of this invention, a tag retainer, a fragmentary portion of a tag body and a fragmentary portion of an animal ear being shown in association therewith, a portion of a second handle member being broken away;

FIG. 3 is a fragmentary view in section taken on the line 3—3 in FIG. 1;

FIG. 4 is a somewhat schematic view partly in side elevation, partly in section, of the tool in fully open position with the tag retainer and the tag body and a tag body holder removed;

FIG. 5 is a somewhat schematic fragmentary view in side elevation partly in section of the tag applying tool in a transitional position;

FIG. 6 is a somewhat schematic view in side elevation partly in section of the tool showing the tool in fully closed position;

FIG. 7 is a somewhat schematic top plan view of the tool;

FIG. 8 is a fragmentary sectional view showing the tool in its transition position in full lines, the tool being shown in fully open position in dot-dash lines;

FIG. 9 is a fragmentary sectional view showing the tool in its fully closed position;

FIG. 10 is a bottom plan view of a tag body holder of the tool, a position at which a compression spring bears being shown in dot-dash lines;

FIG. 11 is a fragmentary view in section taken on the line 11—11 in FIG. 1;

In the following detailed description and the drawings, like characters indicate like parts.

DETAILED DESCRIPTION OF PRESENTLY PREFERRED EMBODIMENT OF THE INVENTION

Figure 13:
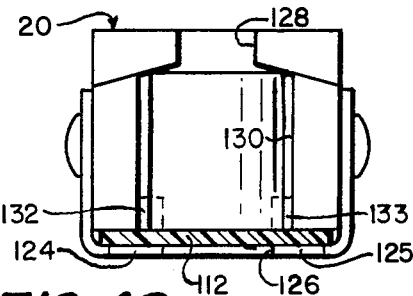
FIG. 13 is a view in section taken on an enlarged scale on the line 13—13 in FIG. 1.
Figure 14:
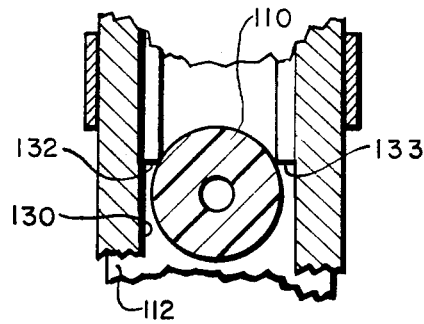
FIG. 14 is a view in section on an enlarged scale on the line 14—14 in FIG. 1.

In FIGS. 1-14 is shown a tool 20 for attaching an identification tag body 22 and a tag retainer 24 to an ear 26 of an animal. The tag body 22 and the tag retainer 24 can be of the type shown in greater detail in application Ser. No. 713,991 of Elmer J. Haas, Jr., filed Mar. 20, 1985, now U.S. Pat. No. 4,672,966 and entitled DEVICE FOR ATTACHING AN IDENTIFICATION TAG TO AN EAR OR THE LIKE OF AN ANI- MAL. The tool 20 includes a main handle member 28, a swinging bracket 30 pivotally attached to the main handle member by a pivot pin 32, a second handle member 34 and sliding link members 35 and 36. The sliding link members 35 and 36 are pivotally mounted on the second handle member 34 on pivot pins 37 and 38, respectively, mounted on the second handle member 34. The swinging bracket 30 is also pivotally mounted on the second handle member 34 on a pivot pin 39. The sliding link member 35 has a slot 43 spaced from pivot pin 37 and between bifurcations 42 and 44. The bifurcations 42 and 44 can slide along opposite sides of a pivot and support pin 46 when the sliding link member 35 moves radially of the pivot and support pin 46. The pivot and support pin 46 is mounted in the main handle member 28. Between the bifurcations 42 and 44 is a bearing surface 48 at the closed end of slot 43. The bearing surface 48 can engage the pivot and support pin 46 and support the sliding link member 35 for swinging on the pivot and support pin 46. The sliding link member 36 has a similar slot 51 spaced from the pivot pin 38 and between bifurcations 50 and 52. The bifurcations 50 and 52 can slide along opposite sides of a pivot and support pin 54 when the sliding link member 36 moves radially of the pivot and support pin 54. The pivot and support pin 54 is mounted on the main handle member 28. Between the bifurcations 50 and 52 is a bearing surface 56 at the closed end of the slot 51. Bearing surface 56 can engage the pivot and support pin 54 and support the sliding link member 36 for swinging on the pivot and support pin 54. The swinging bracket 30 is pivotally attached to the main handle member 28 by the pivot pin 32 and is pivotally attached to the second handle member 34 by the pivot pin 39. The swinging bracket 30 links the main and second handle members 28 and 34 so that the pivot pin 39 remains at a fixed radial distance from the pivot pin 32. The main handle member 28 has a slot 57 in which portions of the sliding link members 35 and 36 and the swinging bracket 30 work. The second handle member 34 has a slot 59 (FIG. 9) in which other portions of the link members 35 and 36 and the swinging bracket 30 work.

The tool 20 is urged to the open position shown in FIG. 1 by spring members 58 and 60. The spring member 58 includes a helical central portion 62, which is mounted on an end portion of the pivot pin 32, an active arm 64, and a back-up arm 66. The active arm 64 carries a flange 68, which engages the main handle member 28 at a slot 70. The back-up arm 66 engages the pivot pin 39. The spring member 60 similarly includes a helical central portion 72, which is mounted on an end portion of the pivot pin 32, an active arm 74, and a back-up arm 76. The active arm 74 carries a flange 77, which engages the main handle member 28. The back-up arm 76 engages the pivot pin 39. The spring members 58 and 60 urge the tool 20 to the position shown in FIG. 4 at which a stop shoulder 78 (FIG. 9) of the second handle member 34 engages a stop face 80 of the swinging bracket 30.

The swinging bracket 30 includes an arm portion 82 on which a drive pin member 84 is mounted. A threaded pin portion 86 of the drive pin member 84 is received in a threaded socket 88 in the arm portion 82. A base portion 90 of the drive pin member 84 rests on a face 92 of the arm portion 82. A body 94 of the drive pin member 84, extends from the base portion 90 and is received in a hollow portion 96 of the tag retainer 24.

The tag retainer 24 includes a hard pointed spike or tip portion 98 which can be forced through the ear 26 of the animal. The hard tip portion 98 is mounted on a tough resilient hollow post portion 100. A flange 102 is provided on the post portion 100 remote from the hard tip portion 98. When the tag retainer 24 and the tag body 22 are assembled on the ear 26, a shoulder 104 on the post portion 100 can engage a shoulder 106 on the interior of a socket 105 of the tag body 22 to lock the tag body 22 and the tag retainer 24 in assembled relation.

Figure 12:
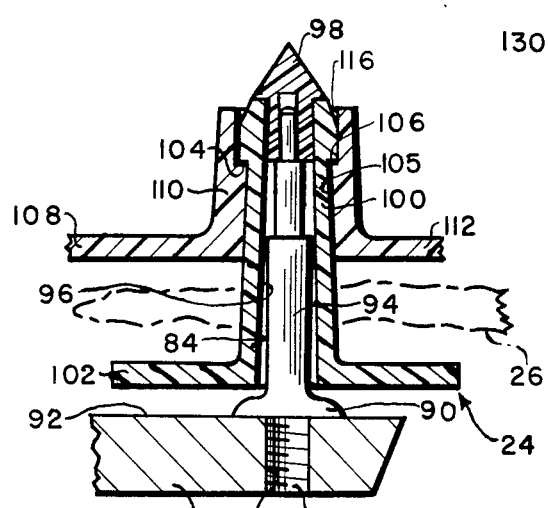
FIG. 12 is a view in section on an enlarged scale showing a tag retainer and a tag body in assembled relation with a portion of an animal ear, which is shown in dot-dash lines, a part of a swinging bracket and a tag retainer support member.
Figure 2:
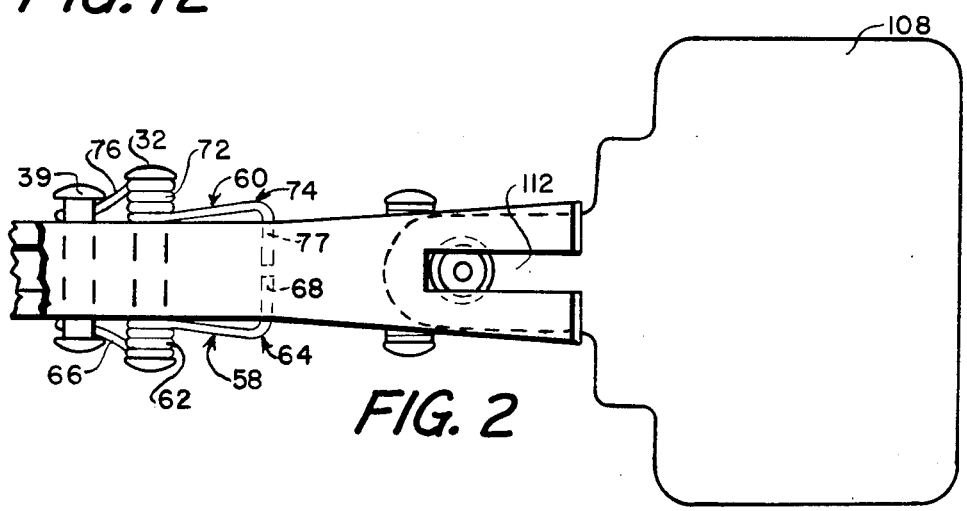
FIG. 2 is a fragmentary view looking in the direction of the arrows 2—2 in FIG. 1.

The identification tag body 22 can be of usual construction and is shown in detail in FIGS. 2 and 12. The tag body 22 includes a flat or panel portion 108 on which appropriate indicia (not shown) can be inscribed. A hollow boss 110 is mounted on a tongue portion 112 of the tag body 22, and the socket 105 extends through the tongue portion 112 and the boss 110. The socket 105 of the boss 110 is counterbored to provide an enlarged portion 116 of the socket 105. The boss 110 extends perpendicularly to the flat portion 108.

The tag body 22 is held in position on the main handle member 20 by a pivoted bracket 118 as shown in FIG. 1. The bracket 118 is pivotally mounted on a pivot pin 120. The pivot pin 120 is carried by the main handle member 28. A compression spring 122 urges the bracket 118 counterclockwise as shown in FIG. 1. The compression spring 122 is mounted in a socket 123 in the main handle member 28, not shown in detail. The position at which the compression spring 122 bears on the pivoted bracket 118 is indicated in dot-dash lines in FIG. 10. Arms 124 and 125 (FIG. 10) of the pivoted bracket 118 engage the tongue portion 112 of the tag body to hold the tongue portion 112 of the tag body 22 against the main handle member 28. The arms 124 and 125 are spaced to form a slot 126 through which the tip portion 98 of the tag retainer 24 can pass. The tip portion 98 also passes through a slot 128 in the main handle member 28. A socket 130 in the main handle member 28 receives the hollow boss 110 of the tag body 22. Lugs 132 and 133 in the socket 130 engage the hollow boss 110 to position the tag body 22 for receiving the tip portion 98 of the tag retainer 24.

When the tool 20 is in use, the tag retainer 24 and the tag body 22 are mounted on the tool as shown in FIG. 1. The tool is positioned with the animal ear 26 as shown, and the handles 28 and 34 are advanced toward each other to cause counterclockwise movement of the swinging bracket 30 as viewed in FIG. 1. During a first part of the advance from the dot-dash line position of FIG. 8 to the full line transition position, the link member 35 bears on the support pin 46, and, as the linkage reaches the transition position shown in full lines, the maximum pressure is exerted on the tag retainer to cause the hard pointed tip portion 98 of the tag retainer to pass through the animal ear 26. As the advance continues through the transition position, the link member 36 comes into engagement with the support pin 54, and the link member 35 draws away from the support pin 46 as shown in FIG. 9, and further closing of the handles 28 and 34 causes further advance of the swinging bracket 30 with reduced force, but with sufficient force to drive the hard pointed tip portion 98 to advance to the position shown in FIG. 12 in which the tag retainer 24 and the tag body 22 are locked in assembled relation.

While the axis of pin 38 may move through the plane of the axes of pins 46 and 39 during continued advance past the transition position, no toggle locking results as link member 35 is not in bearing relation to pin 46.

Further, swinging bracket 30 in the position of FIGS. 6 and 9 is advanced counterclockwise about pin 32 beyond the point it could be advanced in the absence of link 36 by handle members 28 and 34 and link 35 bearing upon pin 46.

The tool illustrated in the drawings and described above is subject to revision without departing from the spirit and scope of the appended claims.

Having described the invention, what we claim as new and desire to secure by Letters Patent is:

1. A tool for applying an identification tag body and a tag retainer to an ear of an animal which includes a main handle member, means for mounting the tag body on the main handle member, a swinging bracket pivotally mounted on the main handle member, means for mounting the tag retainer on the swinging bracket, a second handle member pivotally connected to the swinging bracket, a first sliding link member pivotally connected to the second handle member, a second sliding link member pivotally connected to the second handle member, a first support pin mounted on the main handle member, a second support pin mounted on the main handle member, support means on each of the sliding link members engageable with one of the support pins when the handle members are urged together, means on each of the sliding link members for guiding same when the support means thereof is free of the associated support pin, the first support pin engaging the support means of the associated sliding link member when the handle members are between an open position and a transition position, both support pins engaging support means of associated sliding link members when the handles are in the transition position, the second support pin engaging the support means of the associated sliding link member when the handle members are between the transition position and a closed position, the swinging bracket moving in retainer inserting direction as the handle members are urged together.

2. A tool as in claim 1 in which each sliding link member is bifurcated at the support means thereof and the support means is between associated bifurcations, the bifurcations guiding the sliding link members for engagement of the support means with the associated support pin.

3. A tool for applying an identification tag body and a tag retainer to an ear of an animal which comprises a main handle member, means for mounting the tag body on the main handle member, a swinging bracket pivotally mounted on the main handle member, a second handle member pivotally connected to the swinging bracket, a first sliding link member pivotally connected to the second handle member, and a second sliding link member pivotally connected to the second handle member, means for mounting the tag retainer on the swinging bracket, the swinging bracket advancing the tag retainer through an ear piercing position and into a boss of the tag body for locking therein as the handles are advanced together, support means on each of the sliding link members, support pins mounted on the main handle member for supporting the support means, both support pins engaging associated support means when linkage of the tool is at transition position, one of the support pins engaging an associated support means at other positions so that the linkage of the tool can advance in two stages as the handles are advanced toward each other, the swinging bracket moving in ear puncturing direction with increasing pressure as the handles are urged toward each other in the first stage with a maximum pressure just before the transition position is reached and the tag retainer penetrates the animal's ear, further advance during the second stage following passing of the transition position causing advance with pressure increasing from a lower value.

* * * * *